F. H. VAN HOUTEN.
DOUGH DIVIDER.
APPLICATION FILED AUG. 19, 1915.
1,189,022.
Patented June 27, 1916.
3 SHEETS—SHEET 3.
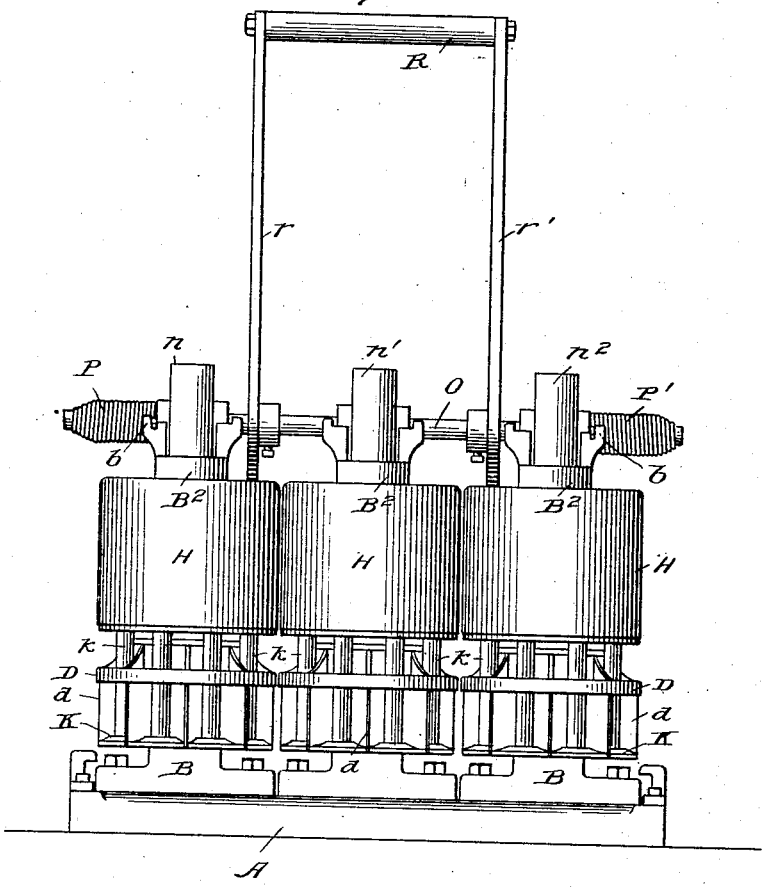
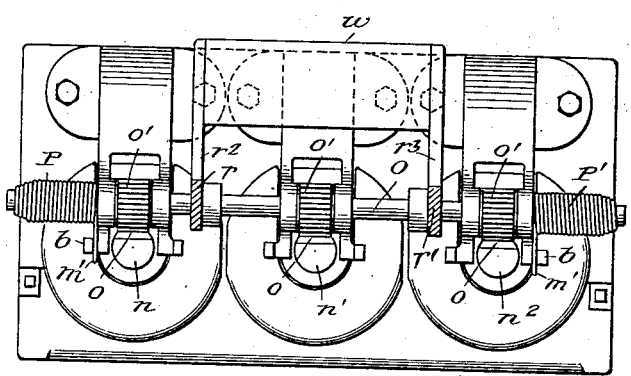

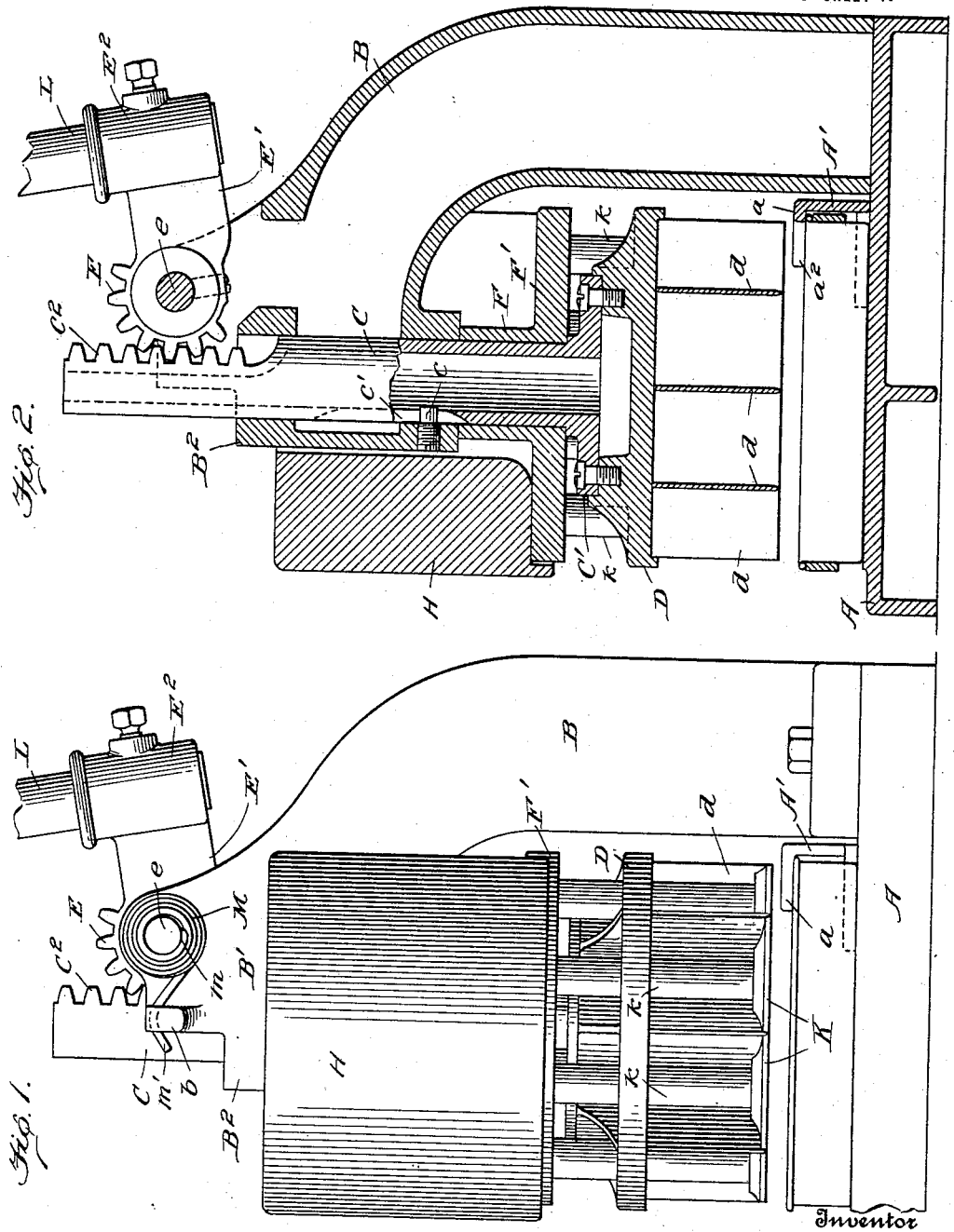

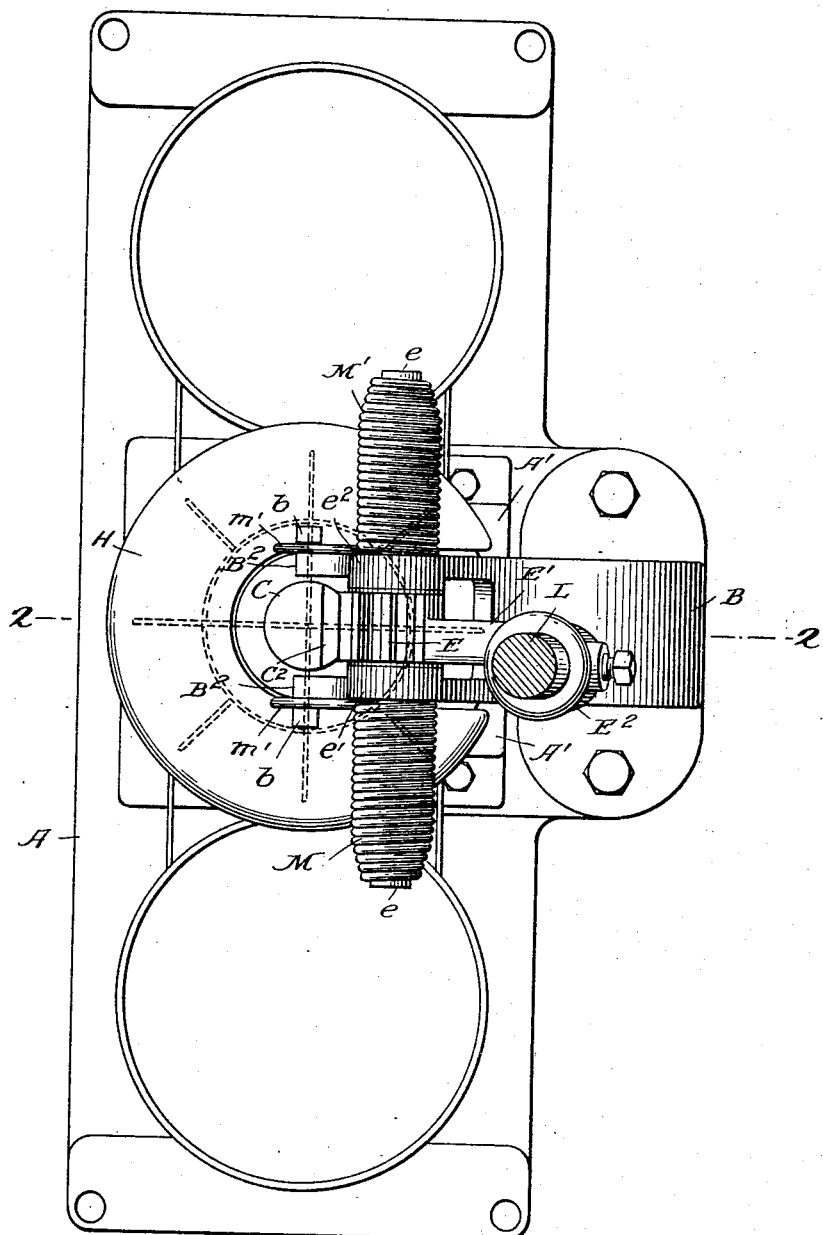

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH-DIVIDER.

1,189,022.  Specification of Letters Patent. Patented June 27, 1916.

Application filed August 19, 1915. Serial No. 46,301.

*To all whom it may concern:*

Be it known that I, FRANK H. VAN HOUTEN, a citizen of the United States, residing at Beacon, in the county of Dutchess and State of New York, have invented certain new and useful Improvements in Dough-Dividers; and I do hereby declare the following to be a full, clear, and exact description of the same, reference being had to the accompanying drawings, forming part of this specification.

This invention relates generally to improvements in dough dividers, more particularly to a machine for sub-dividing a batch of dough into separable portions or pieces for baking in the form of biscuits or rolls.

The improvements of the present invention are conveniently embodied in that type of machines wherein the dough is divided in a pan or receptacle into which the lump of dough has been placed, and the pan or receptacle is then placed in the machine.

The primary object of the invention is to provide a simple, convenient, and compact form of apparatus wherein the batch of dough is first pressed and spread out in the pan to the required thickness and density for baking, and wherein the dough is subdivided by the same or continued movement of the operating device, while a positive pressure is still being applied on the surface of the dough.

Other objects of the invention are to generally improve the construction and arrangement of machines of the above described type, and a full understanding of the nature and objects of the invention will be attained from the following detailed description, when taken in connection with the accompanying drawings which illustrate a structural embodiment of the invention in a preferred form.

The novel features of the invention will be particularly pointed out and specified in the appended claims.

In the drawings:—Figure 1 is a side elevation of a biscuit cutting machine embodying the present improvements. Fig. 2 is a vertical section of the machine taken on a plane indicated by the line 2—2 of Fig. 3. Fig. 3 is a plan view of the same. Fig. 4 is a front elevation of a modified form of biscuit cutting machine. Fig. 5 is a top plan view of the machine illustrated in Fig. 4.

Like characters of reference in the several figures indicate the same parts.

As shown in the drawing, the bed-plate or base of the machine is indicated at A, said bed-plate in the usual construction consisting of a metal casting having a substantially flat upper surface adapted for the support of the pan or receptacle which contains the lump of dough. Positioned centrally on one side of the bed plate is a guide A′ having an overlapping flange $a$ located a sufficient distance above the plane of bed-plate A to permit slipping of a pan thereunder. Flange $a$ is provided with a curved edge $a^2$ corresponding to the curved edge of a pan, whereby the pan may be properly positioned beneath the dough shaping and cutting head, which, it will be understood, is located directly above the guide A′. Behind guide A′ is a bracket B, having a forwardly projecting portion B′, which terminates in a sleeve $B^2$. Sleeve $B^2$ is located above the center of bed plate A and consequently also above the center of a pan in position for cutting and shaping of the dough into the desired loaf.

Projected through sleeve $B^2$ is a vertically movable stem or shank C having at its lower end a support for the dough cutting knives. The vertical movement of shank C is limited by a set-screw or key $c$ in sleeve $B^2$, which set-screw projects into a vertically extending slot $c'$ in shank C. The support for the knives preferably consists of a frame D, secured in any suitable manner to the flange or head C′ at the lower extremity of shank C. At its upper end shank C is provided with rack teeth $C^2$ whereby it may be moved in sleeve $B^2$ by means of a gear segment E in mesh with the rack teeth. Gear segment E is fixed to a transverse shaft $e$, journaled in bearings $e'$ $e^2$ on the forwardly projecting portion B′ of bracket B; said gear segment is also provided with a rearwardly projecting arm E′ having a socket $E^2$ in which is secured a handle lever L for oscillating gear segment E and thereby raising and lowering spindle C. The dough cutting knives $d$ depend from frame D and are radially arranged to impart the desired number of subdivision or pattern to the dough to form a biscuit loaf.

Surrounding shank C above frame D is a sleeve F having at its lower end a flange or head F′ which forms a support for a preferably detachable weight H. Sleeve F and head F′ are slidable independently of shank C and with weight H constitute a means for pressing and spreading the dough in the pan, preliminary to and during cutting of the dough in the loaf of desired design by the knives $d$. The pressure of weight H is transmitted to the dough in the pan by means of presser faces or plates K located in the spaces between the knives and having shanks $k$ projected through knife-frame D. At their upper ends shanks $k$ of presser plates K are secured to head F.

Surrounding the opposite ends of transverse shaft $e$ are coil springs M, M′ of sufficient strength to counterbalance weight H and rotate gear segment E to elevate shank C, the knives and dough pressing means when lever L is released. As shown more particularly in Fig. 1, the outer ends $m$ of the respective springs are secured to shaft $e$, and their inner ends $m'$ are secured to fixed uprights $b$ on sleeve or bearing $B^2$.

From the above description it will be noted that handle lever L controls the movement of shank C and consequently the raising and lowering of the knives $d$, whereas sleeve F and head F′ with presser plates K and weight H (these being hereinafter referred to as "the presser frame") are free in their movements by reason of the slidable mounting of sleeve F on shank C. Under the action of gravity, however, the presser frame follows the knives $d$ downwardly, when the latter are moved by handle lever L in that direction, but on the other hand, the presser frame is elevated by engagement of knife-head D with pressure head F′, when shank C is elevated. Assuming that a lump of dough has been placed in a pan P and the pan has been placed in proper position, as shown in Fig. 3, by drawing the handle down, the knife and presser frames will be caused to descend through gear segment E shifting rack $C^2$, the presser plates K being, at this time, in alinement with the cutting edges of the knives. The pressure of weight H is transmitted directly to the dough in the pan P through the shanks $k$ of the plates K and this causes the dough to spread out and condense in the bottom of the pan. Further lowering movement of the presser frame is arrested by the dough itself, but the knives will continue to move downwardly until they have penetrated and cut the dough. During the cutting stroke of the knives, the presser frame rests on the dough, thereby greatly facilitating a clean cutting stroke of the knives as they penetrate the dough. When the handle lever L is released springs M rotate segment E in the opposite direction, thereby elevating shank C and drawing up the knives, the weight of the presser frame preventing the dough from being drawn up with the knives. Further upward movement of shank C causes frame D to engage flange F′ of the presser frame and elevate it.

Figs. 4 and 5 illustrate a modification. As shown, the dough-divider is provided with three cutters, whereby the dough may be divided in three pans in one operation. An arrangement of this character is of especial utility to bakers who employ triplicate pans, since the dough may be divided in all the pans at once. In the modification the individual knife and presser frames are each identical with the forms illustrated in Figs. 1, 2 and 3, and the several knife frames are provided with shanks $n$, $n'$, $n^2$, all of which are adapted to be raised and lowered by rocking the single shaft O. This is accomplished by providing each shank with a rack $o$ in mesh with a gear segment $o'$ fixed to shaft O. Springs P P′ encircle the shaft O at its respective ends and one end of each spring is secured to the shaft and the other to a fixed portion of the framework, in the manner hereinbefore described, whereby the shaft may be rotated automatically to simultaneously elevate the three cutters. The arms $r$, $r'$ of the handle lever R are fixed to the shaft O, and rear extensions $r^2$, $r^3$ of the respective arms $r$, $r'$ support a counter-balance weight $w$, which assists springs P P′ in keeping lever R and also the cutter elevated. From the above, it will be understood that the three cutters are lowered into operative relation with the dough in the pans beneath, by grasping handle R and pulling forwardly and downwardly. When the dough has been cut, the handle is released, permitting the springs and weight to elevate the cutters.

What is claimed is:

1. In a dough-divider, the combination of a knife frame provided with a plurality of dough-cutting knives, a shank mounted on the knife-frame, with means for imparting upward and lowering movements to the shank to raise and lower the dough-cutting knives, a presser frame slidably mounted on the shank and downwardly movable with the knife-frame when the shank is lowered, the presser frame being arrested in its downward movement by contact with the dough while the shank and knife frame continue to move downwardly to force the knives into the dough, and a weight exerting downward pressure on the presser frame to press and maintain it in contact with the dough during the independent lowering movement of the knives.

2. In a dough-divider, the combination of a knife-frame provided with a plurality of dough-cutting knives, a shank mounted on the knife frame, with means for imparting upward and lowering movements to the shank to raise and lower the dough-cutting knives, a presser frame slidably mounted on the shank and downwardly movable with the knife frame when the shank is lowered, the presser frame being arrested in its downward movement by contact with the dough while the shank and knife frame continue to move downwardly to force the knives into the dough, and a weight detachably mounted directly on the presser frame and exerting downward pressure on the presser frame to press and maintain it in contact with the dough during the independent lowering movement of the knives.

3. In a dough-divider, the combination of a knife frame provided with a plurality of dough cutting knives, a shank mounted on the knife frame, an operating handle having connections for moving said shank vertically to raise and lower the dough cutting knives, a presser frame slidably mounted on the shank and downwardly movable with the knife frame when the shank is lowered, the presser frame being arrested in its downward movement by contact with the dough while the shank and knife-frame continue to move downwardly to force the knives in the dough, a weight exerting downward pressure on the presser frame to press and maintain it in contact with the dough during the independent lowering movement of the knives, and a spring for automatically elevating both frames and the weight, when the operating handle is released.

4. In a dough-divider, the combination of a plurality of knife frames each having dough cutting knives for dividing a batch of dough, shanks mounted on the respective knife frames, an operating handle having connections for moving all of said shanks vertically in unison, presser frames slidably mounted on the respective shanks and downwardly movable in unison with the knife frames, the presser frames being arrested in their downward movement by contact with the dough while the knife frames continue to move downwardly to force the knives into the dough, a weight mounted on each presser frame whereby said frames are movable downwardly into contact with the dough independently of each other during the lowering movement of the knife frames in unison, and means for automatically elevating all the frames and the weights in unison when the operating handle is released.

FRANK H. VAN HOUTEN.

Witnesses:
WILLIAM T. STRIPPEL,
ANNA F. DEVEREAUX.

Copies of this patent may be obtained for five cents each, by addressing the "Commissioner of Patents, Washington, D. C."